United States Patent [19]

Gurumurthy

[11] Patent Number: 4,577,227

[45] Date of Patent: Mar. 18, 1986

[54] TELETEXT FRAMING CODE DETECTOR

[75] Inventor: Kadagattor V. Gurumurthy, Indianapolis, Ind.

[73] Assignee: RCA Corporation, Princeton, N.J.

[21] Appl. No.: 543,034

[22] Filed: Oct. 18, 1983

[51] Int. Cl.[4] .......................... H04N 7/087; H04N 7/08
[52] U.S. Cl. .................................... 358/147; 358/142
[58] Field of Search ............... 358/141, 142, 146, 147, 358/188; 371/37

[56] References Cited

PUBLICATIONS

"Broadcast Teletext Specification", published jointly by British Broadcasting Corporation, Independent Broadcasting Authority and British Radio Equipment Manufacturers' Association, Sep. 1976.
"Wireless World Teletext Decoder", part 1-8, published in *Wireless World*, Nov. 1975-Jun. 1976.
Article by P. Frandon & G. Chauvel entitled "Antiope LSI", published in IEEE Transactions on Consumer Electronics, vol. C-25, No. 3, Jul. 1979, pp. 334-338.

*Primary Examiner*—Tommy P. Chin
*Assistant Examiner*—Michael D. Parker
*Attorney, Agent, or Firm*—Eugene M. Whitacre; Paul J. Rasmussen; Joseph J. Laks

[57] ABSTRACT

In a teletext decoder, a data slicer takes an analog teletext-encoded composite video signal and produces a plurality of serial bits therefrom. A serial-to-parallel converter forms bytes of incoming data from the plurality of bits. To detect the framing code byte in the teletext packet, signals representative of the prime implicants associated with the bytes of incoming data are derived. The derived prime implicant signals are logically analyzed to detect the presence of the prime implicants associated with the framing code.

6 Claims, 4 Drawing Figures

TELETEXT FRAMING CODE DETECTOR

This invention relates to detection of a particular encoded byte of data, such as a framing code byte, within a teletext packet.

Teletext is a means for transmitting textual and graphical information by digitally encoding the transmission. In a teletext-like transmission system, the digital code may be incorporated into a television signal. The specific manner of encoding may vary somewhat depending on the system or standard used. By way of example only, what follows is in conformance with the North American Broadcast Teletext Specification (NABTS).

The teletext encoded composite video signal is schematically illustrated in FIG. 3a. During a horizontal line interval, $T_H$, the teletext encoded signal includes a horizontal sync portion, a color sync burst portion, and a teletext data line portion of duration $T_X$. A teletext data line may be transmitted during particular lines of the vertical blanking interval or may be transmitted during almost every horizontal line for full-field teletext transmission.

The transmission bit rate of the data signal in a teletext date line is the 364th multiple of the horizontal line scanning rate or approximately 5.7 megabits per second for the NTSC horizontal line scanning rate. When the data signal is inserted into color television transmission, the transmission bit rate is 8/5 of the color subcarrier rate and phase locked to the subcarrier. When the data signal is inserted into a monochrome television transmission (with no burst), the transmission bit rate is phase locked to the horizontal line scanning synchronizing signal.

The amplitude modulated teletext data uses a raised cosine, non-return-to-zero binary code. The logical "0" is by definition set at the blanking level of the video signal. A data slicer, equivalent to a one-bit digital-to-analog converter, converts the amplitude modulated teletext signal into a string of logic bits. The maximum length of the string in each data line is 288 bits, arranged as 36 8-bit bytes, as illustrated in FIG. 3b. All bytes have their least significant bit transmitted first.

The teletext data line of FIG. 3b is divided into two parts: the synchronization sequence comprising the first three bytes of the data line and the data packet comprising the remaining bytes. The first two bytes of the synchronization sequence constitute the clock run-in or clock synchronization sequence, consisting of a 16-bit alternating sequence of "1"s and "0"s. The clock synchronization sequence of the teletext signal provides a reference signal that initializes the data slicer and that synchronizes the teletext decoder system clock. The third byte of the synchronization sequence is the framing code. When its presence is detected, it is used as a reference byte for byte synchronization of the decoder.

The data packet is the group of bytes following the synchronization sequence and is organized into three sections. The first section consists of the packet prefix, bytes 4 through 8, and the remaining two sections, not illustrated in FIG. 3b, consist of the data block and optional suffix, respectively. The data block may contain presentation or message data or additional control data. The suffix contains data that is useful in checking for transmission errors.

In the packet prefix, bytes 4 through 6 consist of the packet address or magazine code, bytes P1, P2, and P3. Byte 7 of FIG. 3b consists of the continuity index byte that detects loss of a packet during transmission reception, or decoding. Byte 8 consists of the packet structure byte that defines the packet as being a synchronizing or standard packet.

All of the bytes of the packet prefix are Hamming encoded bytes, wherein bits b1, b3, b5, b7 provide Hamming protection and bits b2, b4, b6, b8 contain the data or message, such as address information in the magazine code bytes P1–P3. The three bytes of the magazine code contain 12 information bits and yield $2^{12}$ or 4,096 possible data channels or packet addresses. The Hamming encoding method allows detection of an even multiple of errors and correction of a single error.

A feature of the invention is a teletext decoder that detects the presence of a particular byte, of incoming teletext data, such as the framing code byte even in the presence of bit transmission error. The byte detector is designed with a reduced number of logic gates. A signal that includes a plurality of bits arranged as a packet of encoded bytes of data is received. Separated bytes of incoming data are formed from the bits. Signals representative of the prime implicants associated with the bytes of incoming data are derived. The derived signals are logically analyzed for the presence of signals representative of the prime implicants associated with the particular byte of encoded data whose presence is to be detected. When a derived prime implicant signal corresponds to one of the prime implicant signals associated with the sought after byte, an output detection signal is generated.

Figure 3:
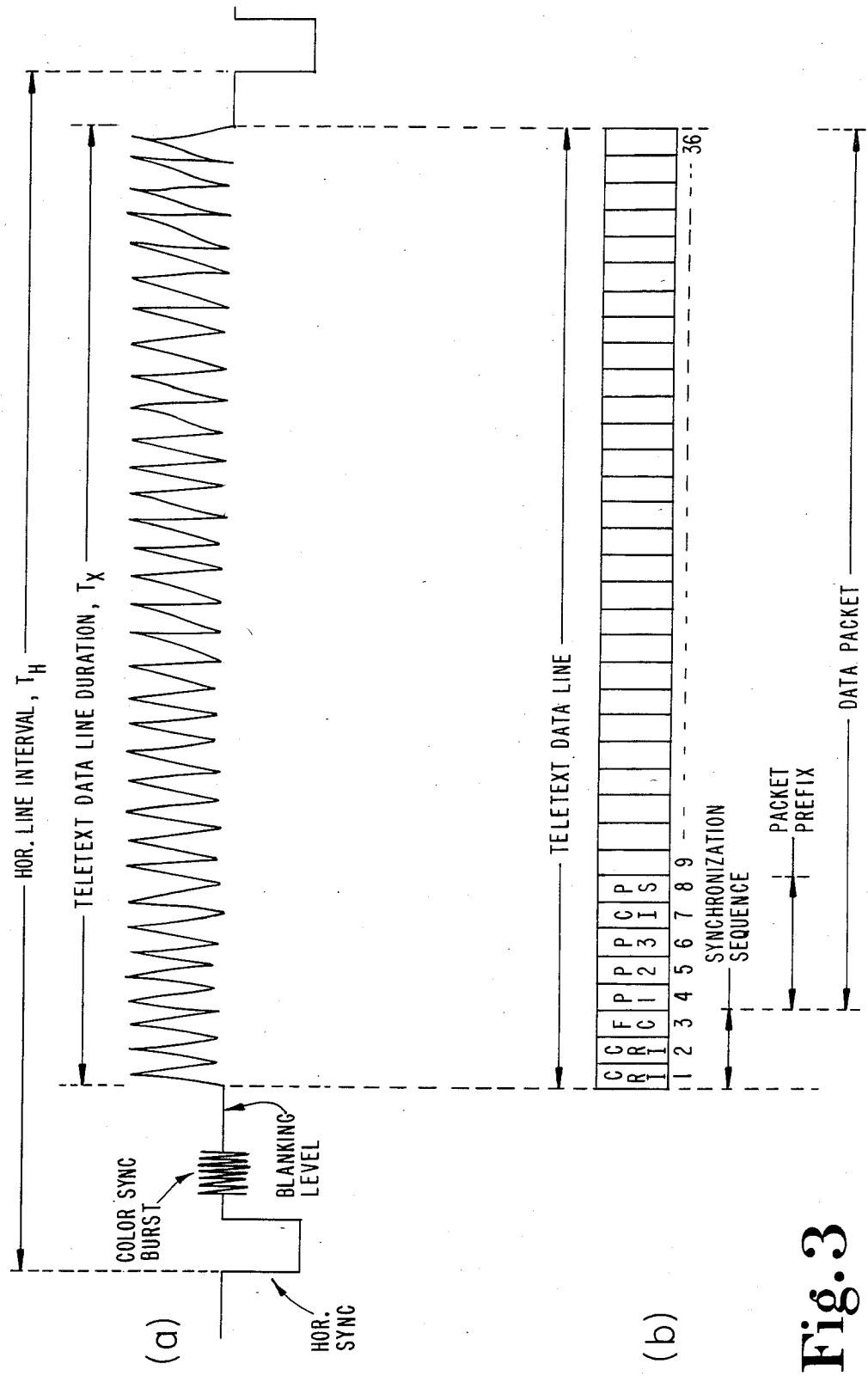

FIG. 3 schematically illustrates a teletext data packet; and

Figure 1:
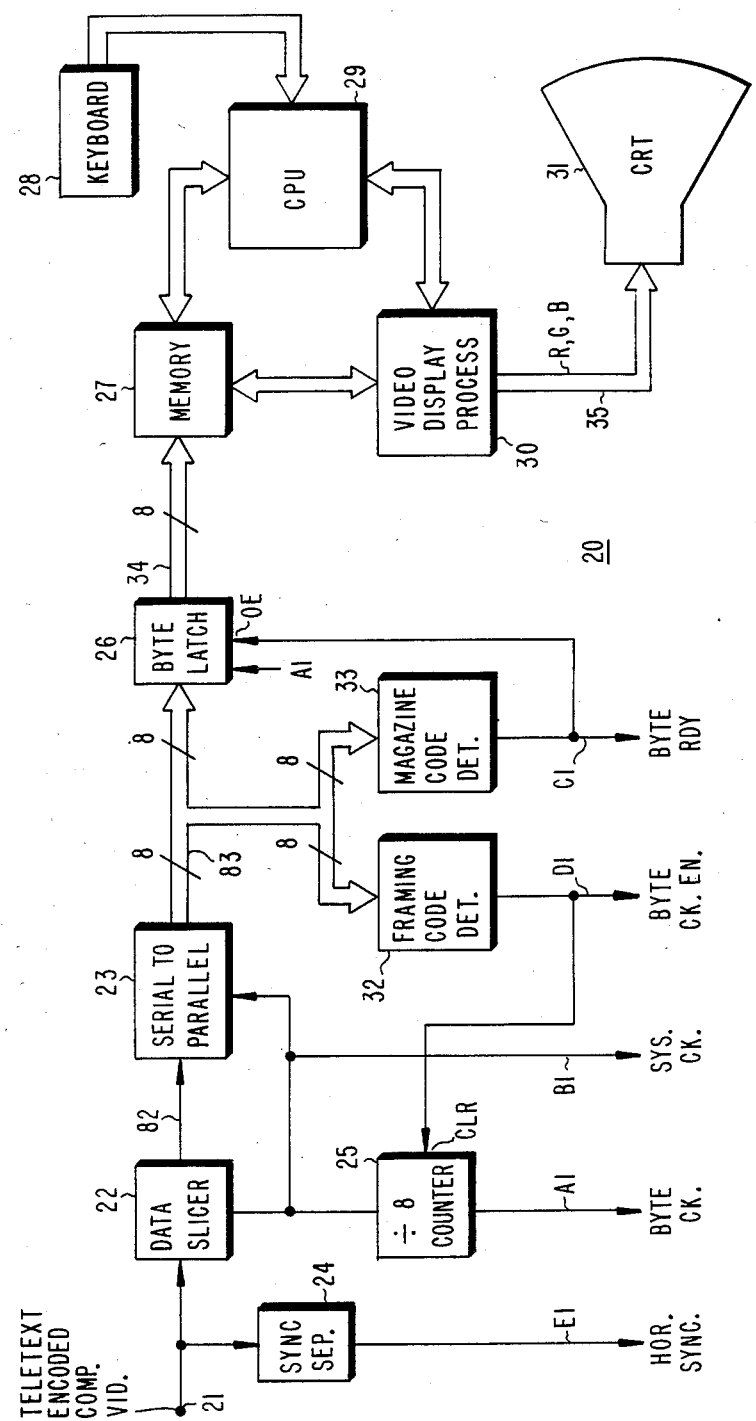
FIG. 1 illustrates a teletext decoder, including a framing code detector embodying the invention.
Figure 4:
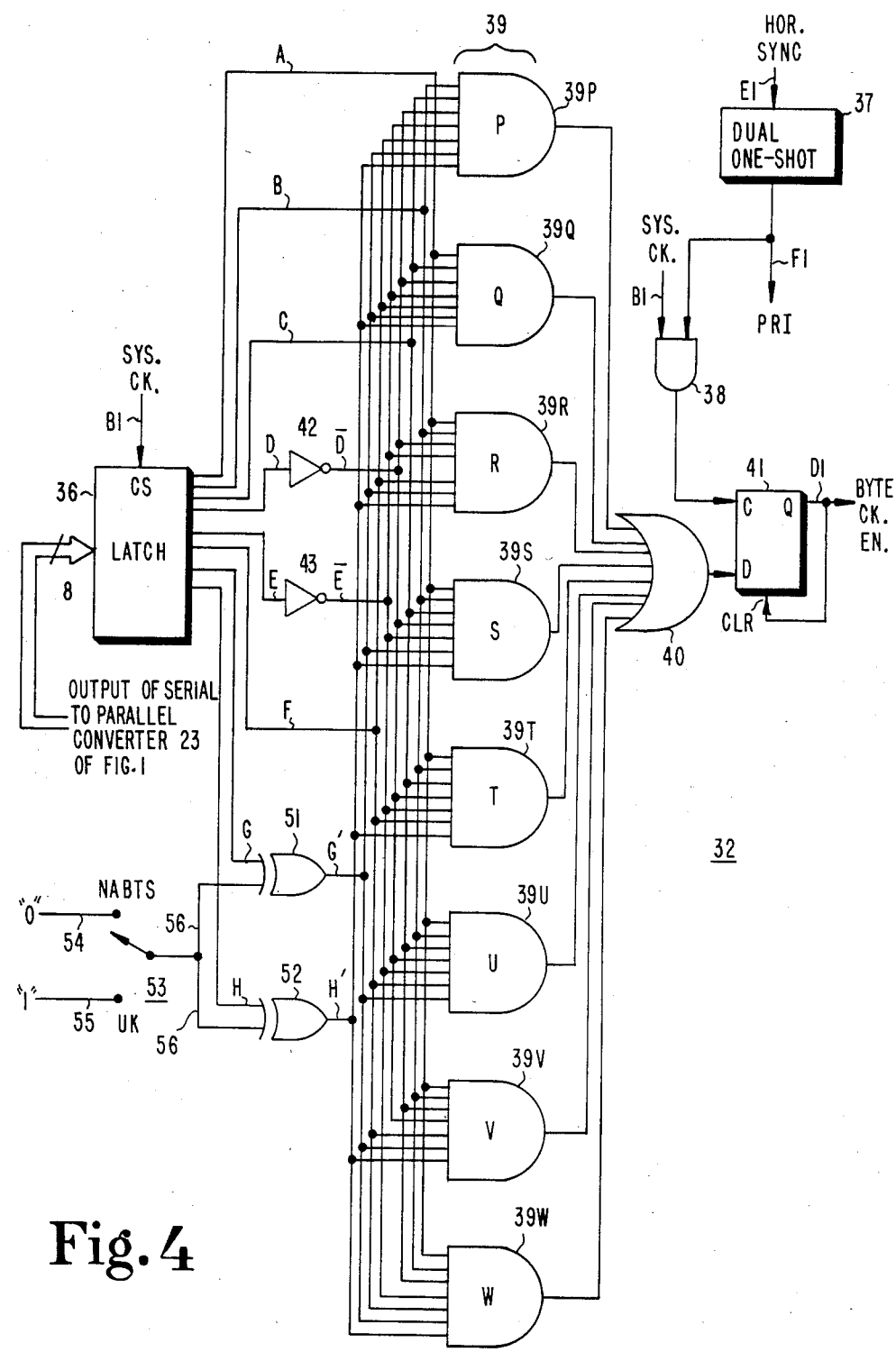

FIG. 4 illustrates another specific embodiment of the framing code detector of FIG. 1 that is capable of detecting two different framing code bytes employed in two different teletext standards.

In teletext decoder 20 of FIG. 1, a teletext-like encoded composite video signal, of the type, for example, that is schematically illustrated in FIG. 3a, is applied to an input terminal 21 of a data slicer 22. Data slicer 22 changes the amplitude modulated signal into a stream of serial bits appearing on a data line 82. Data slicer 22 also generates a teletext system clock on signal line B1 that is of the same frequency and that is in phase synchronism with the clock run-in bits of the synchronization sequence of the teletext packet. A sync separator 24 generates a horizontal sync signal along a signal line E1 that is derived from the teletext encoded composite video signal.

The data stream of serial bits developed on data line 82 is applied to a serial-to-parallel converter 23. Converter 23 generates from the serial data 8-bit bytes appearing on a data bus 83. Operation of serial-to-parallel converter 23 is synchronized by means of the teletext system clock. The eight output signal lines of serial-to-parallel converter 23 are coupled to a byte latch 26 for the purpose of buffer storage.

A byte clock signal is developed on a signal line A1 from the teletext system clock by means of a divide-by-8 counter 25. Thus, the byte clock is generated at the same rate as that of complete bytes of teletext data.

To synchronize the byte clock signal to the incoming bytes of teletext data, a framing code detector 32, embodying the invention, and described below, detects the presence of the framing code byte, byte 3 in the teletext data line of FIG. 3b. Upon detection of the framing code byte, framing code detector 32 develops a byte clock enable signal along a signal line D1. The byte clock enable signal is applied to the clear control terminal CLR of counter 25, initializing that counter and synchronizing byte clock signal generation to framing code byte generation and therefore to generation of all subsequent bytes within the teletext data line.

The user of teletext decoder 20 enters into a microprocessor 29, illustratively by means of a keyboard 28, the magazine and page numbers of the information that is to be displayed on a device such as a cathode ray tube 31. A magazine code detector 33 detects the presence of the magazine code bytes P1, P2, and P3 corresponding to the magazine number entered by the user. When the correct magazine bytes are detected, indicating the transmission of a teletext data line having information that the user wishes to display, a byte ready signal is developed along a signal line C1. Magazine code detector 33 may be of conventional design or may be of design similar to that described in U.S. patent application Ser. No. 543,058, concurrently filed herewith, by K. V. Gurumurthy, entitled TELETEXT MAGAZINE CODE DETECTOR, hereby incorporated by reference.

The byte ready signal is applied to the terminal OE of byte latch 26 to enable the latch to pass through data onto a data bus 34. The byte clock signal developed on signal line A1 is applied to byte latch 26 to place on data bus 34 the 8 bits of incoming data that form a byte of teletext packed information.

The stream of teletext bytes developed along data bus 34 is stored in a memory 27. Memory 27 is accessed by both microprocessor 29 and a video display processor 30 for retrieval of both control and display data. Memory 27 is represented in schematic form only and may be distributed among the various devices communicating therewith. Video display processor 30, under control of microprocessor 29, generates R, G, B signals that are applied to cathode ray tube 31 along a signal bus 35 to provide a display of the teletext message or graphics.

As mentioned previously, framing code detector 32 of FIG. 1 detects the presence of the framing code byte in the incoming teletext packet. The framing code is a unique fixed byte in the synchronization sequence which determines how decoder 20 groups all subsequent bits in the data packet into 8-bit bytes. By way of example, in the North American Broadcast Teletext Specification, the framing code for broadcast teletext comprises the 8-bit sequence fc0=(11100111).

The framing code is an error correction code chosen to minimize the risk of incorrect byte synchronization by enabling teletext decoder 20 to establish byte synchronization even if one bit of the framing code were received incorrectly. Thus, framing code detector 32 may be required to detect the presence of 8 additional framing code patterns with 1-bit error in them, as follows:
 fc1=(01100111)
 fc2=(10100111)
 fc3=(11000111)
 fc4=(11100011)
 fc5=(11100101)
 fc6=(11100110)
 fc7=(11101111)
 fc8=(11110111)

In some prior art framing code detectors, the detector was incapable of detecting the presence of a framing code that was subject to 1-bit error. In others, the incoming bytes of data were directly and logically compared to the nine 8-bit words, fc0 and fc1–fc8, to detect the presence of the framing code byte.

It is desirable to incorporate as many circuit functions of teletext decoder 20 on a single integrated circuit where chip area is at a premium and circuit simplicity is preferred. A feature of the invention is a framing code detector that is implemented with a relatively few number of logic components and with reduced circuitry, which at the same time is capable of detecting a framing code byte that is subject to 1-bit error. In the implementation, illustrated in FIG. 2, of the inventive framing code detector 32 of FIG. 1, advantage is taken of the fact that the particular error encoding technique used to derive the framing code word fc0=(11100111) is susceptible of manipulation using Quine-McCluskey minimization techniques for deriving an optimum switching function that detects the presence of the framing code even when it is subject to 1-bit error. Such Quine-McCluskey minimization techniques are described in the book by Zvi Kohavi, entitled "Switching and Finite Automata Theory", McGraw Hill, 1978.

In accordance with an aspect of the invention, a decoder receives a signal that includes a plurality of bits arranged as a packet of encoded bytes of data. Bytes of incoming data are formed from the plurality of bits. Signals representative of the prime implicants associated with these bytes of incoming data are derived. The derived prime implicant signals are logically analyzed for the presence of signals representative of the prime implicants of the sought after byte of encoded data to detect its presence in the original signal.

The logic circuit that implements the framing code detector is one that minimizes the amount of hardware required. Such minimization is especially desirable when implementing all the functions of teletext decoder 20 on a single VLSI integrated circuit, where chip area is at a premium and where the problem of excessive power dissipation may exist.

A switching function FCD is associated with the correct framing code byte and framing code bytes with one-bit error. This switching function is:

$$FCD = FC0 + FC1 + FC2 + FC3 + FC4 + FC5 + FC6 + FC7 + FC8$$

where the plus (+) symbol represents the logical sum or INCLUSIVE-OR operation, where $$FC0 = (A \cdot B \cdot C \cdot \bar{D} \cdot \bar{E} \cdot F \cdot G \cdot H)$$

$$FC1 = (\bar{A} \cdot B \cdot C \cdot \bar{D} \cdot \bar{E} \cdot F \cdot G \cdot H)$$

$$FC2 = (A \cdot \bar{B} \cdot C \cdot \bar{D} \cdot \bar{E} \cdot F \cdot G \cdot H)$$

$$FC3 = (A \cdot B \cdot \bar{C} \cdot \bar{D} \cdot \bar{E} \cdot F \cdot G \cdot H)$$

$$FC4 = (A \cdot B \cdot C \cdot \bar{D} \cdot \bar{E} \cdot \bar{F} \cdot G \cdot H)$$

$$FC5 = (A \cdot B \cdot C \cdot \bar{D} \cdot \bar{E} \cdot F \cdot \bar{G} \cdot H)$$

$$FC6 = (A \cdot B \cdot C \cdot \bar{D} \cdot \bar{E} \cdot F \cdot G \cdot \bar{H})$$

$$FC7 = (A \cdot B \cdot C \cdot D \cdot \bar{E} \cdot F \cdot G \cdot H)$$

$$FC8 = (A \cdot B \cdot C \cdot \bar{D} \cdot E \cdot F \cdot G \cdot H)$$

where the bar over a variable represents the complemented form of the variable and where the dot (•) symbol represents the logical multiplication or AND operation.

To reduce the complexity of the gating network that detects the presence of the framing code, an optimal switching function OFCD is derived that is equivalent to the framing code detector switching function FCD but is an expression that is a minimal sum-of-products, where each of the products is a prime implicant of FCD. A prime implicant of the frame code detector switching function is a product term that is covered by that switching function and from which term no additional variable may be deleted while still being covered by that function.

Eight terms constitute the set of exhaustive and essential prime implicants, P through W, of the framing code detector switching function FCD, where:

$$P = (B \cdot C \cdot \bar{D} \cdot \bar{E} \cdot F \cdot G \cdot H)$$

$$Q = (A \cdot C \cdot \bar{D} \cdot \bar{E} \cdot F \cdot G \cdot H)$$

$$R = (A \cdot B \cdot \bar{D} \cdot \bar{E} \cdot F \cdot G \cdot H)$$

$$S = (A \cdot B \cdot C \cdot \bar{D} \cdot \bar{E} \cdot G \cdot H)$$

$$T = (A \cdot B \cdot C \cdot \bar{D} \cdot \bar{E} \cdot F \cdot H)$$

$$U = (A \cdot B \cdot C \cdot \bar{D} \cdot \bar{E} \cdot F \cdot G)$$

$$V = (A \cdot B \cdot C \cdot \bar{D} \cdot F \cdot G \cdot H)$$

$$W = (A \cdot B \cdot C \cdot \bar{E} \cdot F \cdot G \cdot H)$$

The optimal function OFCD is then the logical sum of all eight prime implicants, or:

$$\begin{aligned}
OFCD &= P + Q + R + S + T + U + V + W \\
&= B \cdot C \cdot \bar{D} \cdot \bar{E} \cdot F \cdot G \cdot H + A \cdot C \cdot \bar{D} \cdot \bar{E} \cdot F \cdot G \cdot H \\
&+ A \cdot B \cdot \bar{D} \cdot \bar{E} \cdot F \cdot G \cdot H + A \cdot B \cdot C \cdot \bar{D} \cdot \bar{E} \cdot G \cdot H \\
&+ A \cdot B \cdot C \cdot \bar{D} \cdot \bar{E} \cdot F \cdot H + A \cdot B \cdot C \cdot \bar{D} \cdot \bar{E} \cdot F \cdot G \\
&+ A \cdot B \cdot C \cdot \bar{D} \cdot F \cdot G \cdot H + A \cdot B \cdot C \cdot \bar{E} \cdot F \cdot G \cdot H
\end{aligned}$$

Figure 2:
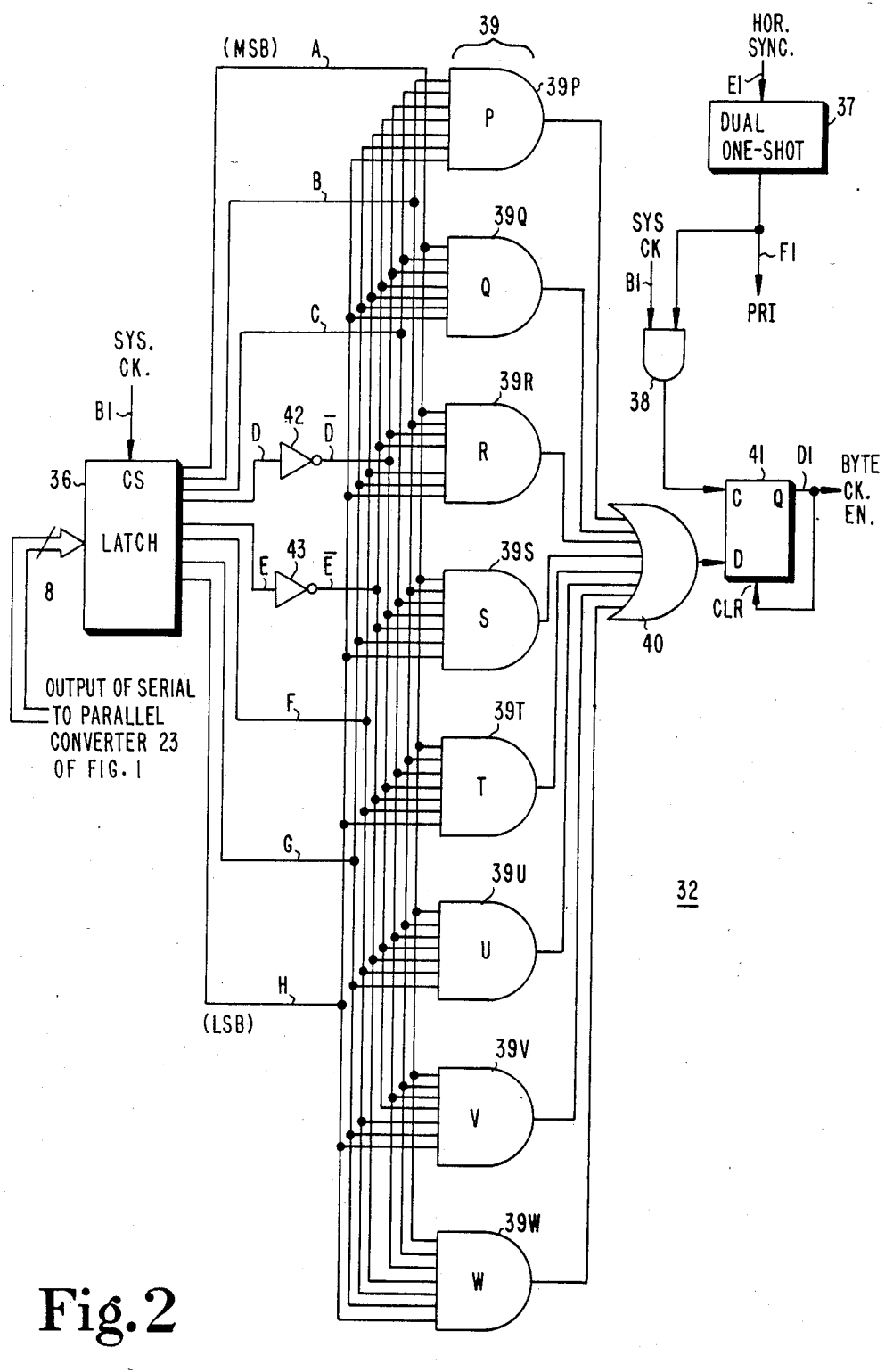
FIG. 2 illustrates a specific embodiment of the framing code detector of FIG. 1.

FIG. 2 illustrates a specific embodiment of framing code detector 32 of FIG. 1, in accordance with the invention, that implements the optimal function OFCD. In FIG. 2, the 8-bit parallel output of serial-to-parallel converter 23 of FIG. 1 is coupled to a latch 36. Eight output signal lines, A through H, are coupled to the output port of latch 36. Upon application of the teletext system clock to the chip select control terminal CS of latch 36, the states of output signal lines A through H are switched into those corresponding to the states of the eight parallel output bits of serial-to-parallel converter 23. The most significant bit is developed at signal line A and the least significant bit is developed at signal line H. By means of inverters 42 and 43, the states of the bits on lines D and E are inverted or complemented. The complemented bits are developed on signal lines $\bar{D}$ and $\bar{E}$, respectively.

The states of output signal lines A through H change with each cycle of the teletext system clock, depending upon the information contained in the serial data stream emerging from data slicer 22. When the last bit of the framing code byte fc0 has been received, the states of the signal lines A through H of FIG. 2 correspond to the respective states of the bits in the framing code byte.

To test for the presence of the framing code byte in the teletext signal, the eight signal lines A, B, C, $\bar{D}$, $\bar{E}$, F, G, H are coupled to a detector stage 39 comprising eight AND gates 39P-39W. Detector stage 39 determines whether or not a prime implicant of the framing code byte is present in the incoming bytes of data. If a prime implicant is present, then its presence is an indication of the occurrence of the framing code byte within the teletext packet.

Each of the eight AND gates 39P-39W detects the presence of a respective one of the prime implicants P through W of the framing code byte by analyzing a corresponding derived prime implicant of the incoming data byte. By way of example, AND gate 39P detects the presence of the prime implicant P of the framing code byte. The prime implicant P equals the product term (B•C•$\bar{D}$•$\bar{E}$•F•G•H). To perform the detection, the appropriate seven of the eight signal lines from latch 36 are applied as inputs to AND gate 39P. The seven signal lines are B, C, $\bar{D}$, $\bar{E}$, F, G, H. If the prime implicant P is present in the incoming byte of data, the output of gate 39P goes high. Similarly, if one of the other prime implicants Q through W is present in the incoming byte of data then the output of the appropriate one of AND gates 39Q-39W goes high, thereby detecting the presence of that prime implicant.

To detect the presence of the framing code byte, even in the event of one-bit error, the outputs of all the prime implicant AND gates 39P-39W are coupled as inputs to an OR gate 40. OR gate 40 performs the function of forming the optimal framing code detector switching function OFCD. When the output of OR gate 40 goes high, the presence of the framing code byte in the incoming bytes of teletext data is detected.

The output of OR gate 40 is applied to the D input of a C-D flip-flop 41. The clock or C input terminal of flip-flop 41 is coupled to the output of an AND gate 38. One input of AND gate 38 is coupled to the teletext system clock signal line B1 to clock out the state of the D input terminal to the Q output terminal.

By means of application of a packet recognition interval signal PRI, applied to the second input of AND gate 38, AND gate 38 is enabled only during a relatively narrow window around the expected occurrence of the framing code byte. Packet recognition interval signal PRI is developed at the output of a dual one-shot 37 that is synchronized by means of a horizontal sync signal applied thereto. The output of dual one-shot 37, developed on a signal line F1, is the packet recognition interval signal PRI. The signal is in the high state only during the narrow window around the expected occurrence of the framing code byte. The C-D flip-flop 41 is therefore clocked only during the occurrence of the packet recognition interval signal. This technique reduces the possibility of a erroneous detection of a framing code byte during those intervals within the teletext packet when no framing code byte is expected.

When the output of OR gate 40 goes high, indicating the presence of the framing code byte, the Q output of flip-flop 41 also goes high to produce the byte clock enable signal on signal line D1. This signal is used by teletext decoder 20 of FIG. 1 to synchronize the byte clock generator, counter 25. The Q output of flip-flop 41 is also coupled to the clear input, CLR, of the flip-flop to produce a byte clock enable signal having a duration of a single teletext system clock pulse.

Framing code detector 32 of FIG. 2, embodying the invention, is formed by a gating network of reduced complexity in an implementation that reduces the number of gates required and the number of inputs required to each of the gates, compared to the number required in a direct logical implementation of the framing code detector function.

The technique of forming prime implicants to detect the presence of a particular byte of incoming data may be extended to detecting bytes other than the framing code byte. For example, the Hamming encoded magazine number bytes P1, P2, P3 may be detected using the technique of deriving prime implicants in a manner similar to that just discussed with respect to detection of the framing code byte. Such an implementation is described in the aforementioned U.S. patent application of K. V. Gurumurthy.

FIG. 4 illustrates an embodiment of framing code detector 32 similar to that of FIG. 2 but that is additionally capable of detecting the presence of the framing code byte of a teletext signal transmitted in accordance with the teletext standard of the United Kingdom (UK), modified to take into account 525 line, 60 field, NTSC television transmission, as proposed by the United Kingdom Teletext Industry Group. Elements in the two figures that are identified similarly function in a similar manner.

In the modified UK teletext system, the framing code byte for broadcast television is fcu=(11100100). The optimal switching function OFCU, in terms of the modified prime implicants P through W of the modified framing code detector switching function, is:

$$OFCU = P + Q + R + S + T + U + V + W$$

where $$P = B \bullet C \bullet \overline{D} \bullet \overline{E} \bullet F \bullet \overline{G} \bullet \overline{H}$$

$$Q = A \bullet C \bullet \overline{D} \bullet \overline{E} \bullet F \bullet \overline{G} \bullet \overline{H}$$

$$R = A \bullet B \bullet \overline{D} \bullet \overline{E} \bullet F \bullet \overline{G} \bullet \overline{H}$$

$$S = A \bullet B \bullet C \bullet \overline{D} \bullet \overline{E} \bullet \overline{G} \bullet \overline{H}$$

$$T = A \bullet B \bullet C \bullet \overline{D} \bullet \overline{E} \bullet F \bullet \overline{H}$$

$$U = A \bullet B \bullet C \bullet \overline{D} \bullet \overline{E} \bullet F \bullet \overline{G}$$

$$V = A \bullet B \bullet C \bullet \overline{D} \bullet F \bullet \overline{G} \bullet \overline{H}$$

$$W = A \bullet B \bullet C \bullet \overline{E} \bullet F \bullet \overline{G} \bullet \overline{H}$$

Comparing the modified UK prime implicants to the corresponding NABTS prime implicants, previously discussed, one notes that they differ only with respect to the switching variables G and H. In the NABTS system, the variables G and H always appear in a given prime implicant term in their uncomplemented form, whereas in the modified UK system these variables always appear in their complemented form.

This observation is beneficially utilized in designing the logic network of the framing code detector 32 of FIG. 4. In FIG. 4, signal lines G and H are coupled respectively to inputs of XOR gates 51 and 52. Output signal line G' of XOR gate 51 is coupled to inputs of the AND gates of detector stage 39 other than to that of AND gate 39T. Output signal line H' of XOR gate 52 is coupled to inputs of the AND gates of detector stage 39 other than to that of AND gate 39U. A signal line 56 is coupled to a selection switch 53 and to the other inputs of XOR gates 51 and 52.

Selection switch 53 when thrown to its upper position couples the logical "0" state developed on a signal line 54 to the corresponding inputs of XOR gates 51 and 52. In this switch position, output signal lines G' and H' go high only when the states of signal lines G and H are high or in the logical "1" state, as is required to properly detect the framing code byte in a NABTS teletext signal.

Selection switch 53 when thrown to its lower position couples the logical "1" state developed on a signal line 55 to the corresponding inputs of XOR gate 51 and 52. In this switch position, output signal lines G' and H' go high only when the states of signal lines G and H are low or in the logical "0" state, as is required to properly detect the framing code byte in a modified UK teletext signal.

It has therefore been shown that the technique of using prime implicants enables a framing code detector to be designed that detects both NABTS and modified UK framing code bytes using logic hardware of substantially no greater complexity than the hardware that would have been used for a framing code detector that can detect the framing code byte employed in only one of the standards.

What is claimed is:

1. A teletext decoder capable of detecting a sought after byte of encoded data in the presence of one-bit error, comprising:
   a data slicer responsive to an amplitude modulated, teletext encoded composite video signal for generating a serial data stream of logical bits representing a teletext packet, said data stream subject to error in the generation of the bits thereof;
   a serial-to-parallel converter for generating bytes of incoming data from said serial data stream;
   means for developing, on a plurality of signal lines, signal states representative of respective bits of prime implicant terms associated with said bytes of incoming data; and
   a detector stage responsive to the signal states of said signal lines for logically analyzing the prime implicant terms associated with said bytes of incoming data to detect the presence of a prime implicant term associated with the sought after byte of encoded data to provide a detection signal when that byte is present in the serial data stream.

2. The teletext decoder of claim 1 wherein said detector stage comprises a plurality of AND gates and an INCLUSIVE-OR gate coupled to the outputs of said AND gates, said detection signal being developed at the output of said OR gate.

3. A teletext decoder that is capable of selectively detecting either one of two different framing code bytes employed in two different teletext standards, said decoder comprising the decoder of claim 1 and a logic network interposed between said detector stage and at least some of the plurality of signal lines for complementing the states of selected ones of said plurality of signal lines depending on which of the two teletext standards is employed.

4. In the process of decoding a teletext-like signal, a method of detecting the presence of a sought after byte of encoded data in said signal, comprising the steps of:

(a) receiving a signal that includes a plurality of bits arranged as a packet of teletext-like encoded bytes of data;
(b) forming bytes of incoming data from said plurality of bits;
(c) deriving signals having bits representative of respective bits of prime implicants associated with said bytes of incoming data; and
(d) logically analyzing the bits of the derived signals to detect the presence of the bits of a prime implicant associated with the sought after byte of encoded data to detect that byte's presence in the teletext-like signal.

5. The method of claim 4 wherein the sought after byte of data is a framing code byte fc0=(11100111) in a synchronization sequence of a teletext data line, and wherein step (c) comprises the step of deriving signals representative of the prime implicants $P=(B \cdot C \cdot \overline{D} \cdot \overline{E} \cdot F \cdot G \cdot H)$, $Q=(A \cdot C \cdot \overline{D} \cdot \overline{E} \cdot F \cdot G \cdot H)$, $R=(A \cdot B \cdot \overline{D} \cdot \overline{E} \cdot F \cdot G \cdot H)$, $S=(A \cdot B \cdot C \cdot \overline{D} \cdot \overline{E} \cdot G \cdot H)$, $T=(A \cdot B \cdot C \cdot \overline{D} \cdot \overline{E} \cdot F \cdot H)$, $U=(A \cdot B \cdot C \cdot \overline{D} \cdot \overline{E} \cdot F \cdot G)$, $V=(A \cdot B \cdot C \cdot \overline{D} \cdot F \cdot G \cdot H)$, $W=(A \cdot B \cdot C \cdot \overline{E} \cdot F \cdot G \cdot H)$, where A,B,C,D,E,F,G,H represent switching variables.

6. A method of claim 5 wherein the sought after byte of data is selectively either the aforementioned framing code byte fc0 or a framing code byte fcu=(11100100) and wherein step (c) includes the step of complementing the switching variables G and H of the prime implicants P through W prior to performing step (d) when the framing code byte fcu is selected as the sought after byte of data.

* * * * *